Figure 1:
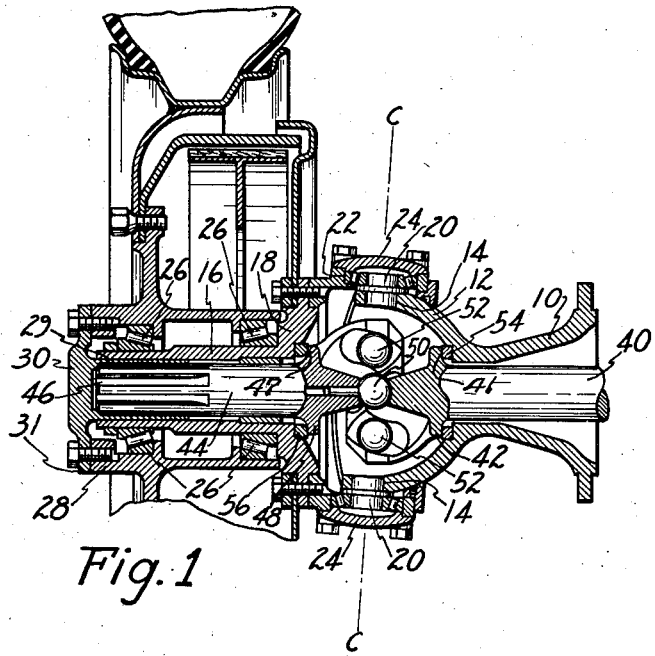

May 23, 1944.   E. B. STURGES   2,349,388
STEERING DRIVE AXLE
Filed May 17, 1941

INVENTOR
EDWARD B. STURGES
BY
ATTORNEY

Patented May 23, 1944

2,349,388

UNITED STATES PATENT OFFICE 2,349,388

STEERING DRIVE AXLE

Edward B. Sturges, South Bend, Ind., assignor to Bendix Aviation Corporation, South Bend, Ind., a corporation of Delaware Application May 17, 1941, Serial No. 393,856

7 Claims. (Cl. 180—43)

My invention relates to universal joints and more particularly to a Weiss type universal joint for use in a driving, steering axle construction.

A Weiss type joint is one made in accordance with Weiss Patent No. 1,522,351 and consists of two interfitting yoke members having non-concentric races cut on proximate faces of the yokes in which races there are retained torque transmitting balls. Weiss type joints differ from the ordinary Cardan universal joint in that the angular velocity of the driven member is uniform as compared to that of driving member and does not fluctuate as is the case with a Cardan joint. Unlike many other joints, however, Weiss joints are not held together longitudinally by their structure. Outside means must be provided to hold the joint together because application of high torque at large angles of bend are likely to fracture the yokes if they are allowed to spread too far apart.

One construction requiring a universal joint to which the Weiss joint is adapted is that of the front axle of a truck having a front wheel drive.

There have been several attempts to provide means for holding a Weiss joint together in a steering axle to prevent breakage on turns. One such attempt has been the use of a spring between the splined inner ends of the two drive shafts in the differential gearing. The spring urges the drive shafts outwardly toward their respective wheels and the shafts press against the stub shafts or wheel driving members of the joints. The stub shafts are held in the wheel or bearing structure so that they cannot move longitudinally outwardly. This method is subject to the drawback of wear on the pivot ball, usually provided at the center of the joint, if the spring is powerful enough to overcome spreading of the joint due to torque. If the spring is made weaker to prevent wear on the pivot ball the joint will spread under high torque conditions.

Another attempt to solve the problem of spreading joints in driving steering axles is to place shims between the splined ends of the drive shafts where they meet in the differential gearing. This holds the shafts against the stub member of the joints to prevent spreading. The varying lengths of the axle housing parts and the drive shafts require selective assembly of shims in the final assembly of the joints into the axle. Selective assembly of parts is not suitable for mass production items such as trucks.

Still another attempt to solve the problem has been the use of bell shaped housings or shells on the universal joint itself to hold it together. In such cases the outside of one or both of the yokes must be machined to a perfect spherical shape, which operation is costly. A hemispherically shaped shell with a central hole may be placed over the shaft of its respective yoke and secured to the other yoke or to a matching hemispherical shell similarly placed over the other yoke. Such shells readily wear out, however, and the life of the joint is therefore limited.

My invention consists of means within the steering axle housing which hold the two yoke members to prevent them from spreading too far apart. More particularly, it includes the provision of thrust bearing surfaces on the axle and spindle housing adjacent to the steering joint to accomplish this result. In machining the steering axle members in the region of the steering joint, there are very few tolerances involved in placing the thrust ring with relation to the king pin centerline which intersects the universal joint at its center. Moreover, these are tolerances which easily can be held accurately in machining. The thrust rings can therefore be very accurately placed with relation to the steering joint to insure a positive holding of the joint yokes within a maximum allowable spread. The universal joint can also be held commercially to very close tolerances. This structure results in a very accurate driving steering joint assembly, locating the center of the universal joint positively on the king pin centerline. The varying other dimensions of the axle are of no importance, because longitudinal difference can be accommodated by the splines at the inner ends of the drive shafts.

It is therefore an object of my invention to provide a steering axle construction with bearing surfaces which hold a Weiss type universal joint in an operative condition at all times.

It is another object of my invention to provide a steering axle constructed of standard parts, doing away with selective assembly in manufacture and service of axles.

It is another object to provide a cheap and efficient steering axle construction for Weiss type universal joints.

Another object is to provide a driving steering axle construction in which measurement of parts and use of skilled labor is not essential in original assembly or service operations.

Figure 2:
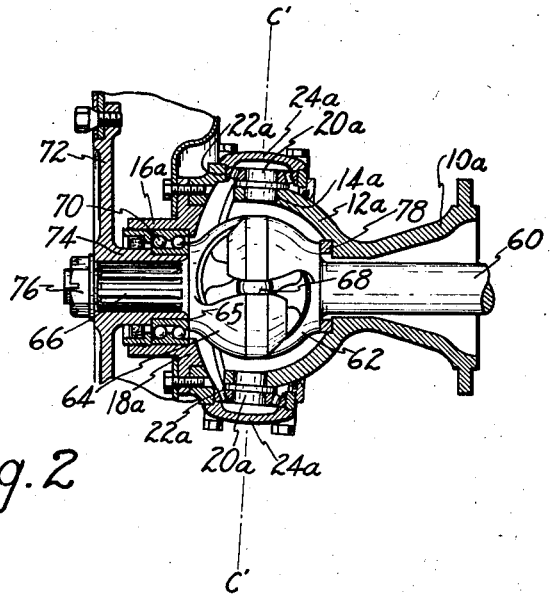

These and other objects and advantages of my invention will be apparent in the following description and claims which may best be understood when considered in connection with the accompanying drawing, in which:

Figure 1 is a view in vertical section through a steering axle housing of the full-floating type containing a Weiss type joint; and Figure 2 is a view in vertical section through a steering axle housing of the semi-floating type containing a Weiss type joint.

An axle housing of the full-floating type is one wherein the stub shaft is not secured longitudinally at its outer end to a driven wheel. It has the advantage of freedom from possible loss of a wheel if the stub shaft should break. An axle housing of the semi-floating type has the stub shaft secured longitudinally to the wheel at its outer end and if the stub shaft should fail the wheel might fall off the axle. My invention is applicable to both types of axle construction as shown in Figures 1 and 2.

In Figure 1, which shows a steering axle of the full-floating type, an axle housing 10 flares outwardly to form a bell shape 12 for the steering joint. Holes 14 are drilled in the top and bottom of bell shape 12 along the axis C—C which is at the selected angle of king pin inclination. A steering spindle 16 having a bell shaped spindle housing 18 on its inner end is fitted over bell shape 12 of the axle housing 10. King pin members 20 are fitted into holes 14 in bell housing 12, and through holes 22 in spindle housing 18. Cover plates 24 are bolted to spindle housing 18 over king pin members 20 to hold them in place. Bearings 26 are fitted on spindle 16 and rotatably support a front wheel 28 mounted thereon. An internally splined cup member 30 having a bottom annular flange 31 is bolted to wheel 28 and has a cup portion 29 fitting within steering spindle 16.

A drive shaft 40 having a Weiss type universal joint yoke 42 formed integrally on one end is placed within axle housing 10. A stub shaft member 44 having external splines 46 on its outer end is placed within steering spindle 16 and has an integral yoke member 48 on its inner end mating with yoke member 42. The two yoke members 48 and 42 are longitudinally separated by a pivot ball 50 and are angularly separated by torque transmitting balls 52.

Driving torque is transmitted to the wheel 28 from drive shaft 40, through universal joint yokes 42 and 48 and stub shaft 44. Driving torque is transmitted to the shaft 40 at its inner end, which is fitted into a differential gear unit which is not shown. Thus shaft 40 drives yoke 42 which drives yoke 48 on stub shaft 44 through balls 52. Stub shaft 44 drives wheel 28 by the contact of its splines 46 with the internally splined cup member 30 which is bolted to wheel 28.

When torque is thus transmitted it tends to make the two yoke members 48 and 42 of the Weiss joint separate longitudinally. If the yokes spread too far while the wheel 28 is turned at a large angle on king pins 20 with relation to axle housing 10, it might result in fracture of the yokes 48 and 42. To prevent this from happening I provide a thrust ring insert 54 in the axle housing 10, which abuts upon an annular shoulder or seat 41 formed in the yoke member 42. Likewise I provide a thrust ring insert 56 in the steering spindle 16, which abuts upon an annular shoulder or seat 47 formed in the yoke member 48. Thrust rings 54 and 56 absorb the longitudinal thrust of the yoke members 42 and 48 when torque is being transmitted to the wheel.

Moreover the thrust rings 54 and 56, being accurately held by the steering joint structure at a fixed distance from the king pin centerline, hold the joint yokes in a fixed longitudinal position so that the center of the pivot ball 50 and therefore the center of the universal joint is always on the king pin centerline C—C.

In Figure 2 a driving steering axle of the semi-floating type is shown. An axle housing 10a has a bell shaped portion 12a having holes 14a drilled in the bottom and top thereof along the line C'—C'. A bell shaped spindle housing 18a having a steering spindle 16a is fitted over bell shape 12a and has holes 22a in the top and bottom thereof through which king pin members 20a are inserted into the holes 14a of the bell shaped axle housing portion 12a. Cover plates 24a are bolted to bell shaped spindle housing 18a to retain the king pins 20a in their proper places. Axle housing 10a retains the drive shaft 60 having a Weiss type joint yoke 62 formed on or secured to one end. An interfitting Weiss type yoke member 64 having a splined stub shaft 66 is fitted into yoke member 62 and separated therefrom longitudinally by a pivot ball 68.

A thrust bearing 70 mounted within steering spindle 16a rotatably supports a front wheel 72 having a hollow internally splined central flange 74. Splined stub shaft 66 is fitted into splined flange 74 and has a yoke shoulder 65 resting against the rotating part of bearing 70. Wheel 72 is secured axially against the outer side of the rotatable part of bearing 70 by a nut 76 screwed on the outer end of stub shaft 66 and tightened against wheel 72, the shoulder 65 of yoke 64 pressing against the inner side of the rotatable part of bearing 70.

Driving torque is transmitted to wheel 72 through drive shaft 60, yoke members 62 and 64, and stub shaft 66. Stub shaft 66 in turn drives wheel 72 through central flange portion 74. The driving torque tends to force the yoke members 62 and 64 apart, forcing shaft 60 towards the differential gearing. To prevent the yoke 62 from moving inwardly too great an amount, I place a thrust ring 78 in axle housing 10a contacting the yoke member 62. Yoke member 62 therefore maintains a fixed longitudinal position because it is secured against thrust ring 78. In the construction of Figure 2, only one thrust ring is required to prevent spreading of one yoke with relation to the others. This structure also keeps the center of the universal joint on the king pin axis C'—C'.

It is obvious that my invention is not limited to a thrust ring construction. Machined surfaces on the various parts could serve the purpose, as well as any other known type of bearing construction. I therefore do not intend to limit my invention to the forms shown or described, nor limit it in any other way except by the following claims.

I claim:

1. In a steering and driving wheel construction for automotive vehicles, an axle housing and a wheel spindle having their contiguous ends shaped to form a housing, king pins connecting said ends in swinging relation, a drive shaft in the axle housing and a stub shaft in the wheel spindle, a universal joint of the self-centering constant velocity type mounted in said housing and including a pair of yoke members having torque transmitting members therebetween for drivably connecting the drive shaft and the stub shaft, a member interposed and secured between said yoke members for limiting movement of said yoke members toward each other, a pair of oppositely positioned annular shoulders formed in the inner surfaces of said ends concentric with said shafts, and a pair of thrust rings mounted on said shoulders and so positioned that each is at times in bearing engagement with its proximate yoke member for transmitting forces in the universal joint into the axle housing and the wheel spindle and for positively limiting the amount of endwise movement tending to separate said universal joint yet providing for the necessary movement axially of one yoke member relative to the other.

2. In a steering and driving wheel construction for automotive vehicles, an axle housing and a wheel spindle having their adjacent ends shaped to form a housing, pivot means connecting said ends in swinging relation, a drive shaft in the axle housing and a stub shaft in the wheel spindle, a universal joint of the self-centering constant velocity type mounted in said housing and including a pair of yoke members for drivably connecting the drive shaft and the stub shaft, a ball secured and interposed between said yoke members for limiting movement of said yoke members toward each other, a pair of oppositely positioned annular shoulders formed in the inner surfaces of said ends concentric with said shafts, and a pair of thrust rings mounted on said shoulders and so positioned that each is at times in bearing engagement with its proximate yoke member for transmitting forces in the universal joint into the axle housing and the wheel spindle and for positively limiting the amount of endwise movement tending to separate said universal joint yet providing for the necessary movement axially of one yoke member relative to the other and permitting radial adjustment of the shafts relative to the thrust rings.

3. In a steering and driving wheel construction for automotive vehicles, an axle housing and a wheel spindle having their contiguous ends shaped to form a housing, king pins connecting said ends in swinging relation, a drive shaft in the axle housing and a stub shaft in the wheel spindle, a universal joint of the self-centering constant velocity type mounted in said housing including a pair of yoke members having a plurality of torque transmitting members therebetween for drivably connecting the drive shaft and the stub shaft, a ball secured and interposed between the ends of said yoke members for limiting movement of said yoke members toward each other and for preventing separation of the stub shaft and the drive shaft upon removal from the vehicle, a pair of oppositely positioned annular shoulders formed in the inner surfaces of said ends concentric with said shafts, and a pair of thrust rings mounted on said shoulders and so positioned that each is at times in bearing engagement with its proximate yoke member for transmitting forces in the universal joint into the axle housing and the wheel spindle and for positively limiting the amount of endwise movement tending to separate said universal joint yet providing for the necessary movement axially of one yoke member relative to the other.

4. In a steering and driving wheel construction for automotive vehicles, an axle housing and a wheel spindle having their adjacent ends shaped to form a housing, pivot means connecting said ends in swinging relation, a drive shaft in the axle housing and a stub shaft in the wheel spindle, a universal joint of the self-centering constant velocity type mounted in said housing and including a pair of yoke members having torque transmitting members therebetween for drivably connecting the drive shaft and the stub shaft, a member interposed and secured between the ends of said yoke members for limiting movement of said yoke members toward each other, and a pair of oppositely positioned annular shoulders formed in the inner surfaces of said ends concentric with said shafts, and a pair of thrust members mounted on said shoulders and so positioned that each is at times in bearing engagement with its proximate yoke member for transmitting forces in the universal joint into the axle housing and the wheel spindle and for positively limiting the amount of endwise movement tending to separate said universal joint yet providing for the necessary movement axially of one yoke member relative to the other, said thrust members being of the type whereby the drive shaft and the stub shaft are not supported radially by said thrust members.

5. In a steering and driving wheel construction for automotive vehicles, an axle housing and a wheel spindle having their contiguous ends shaped to form a housing, king pins connecting said ends in swinging relation, a drive shaft in the axle housing and a stub shaft in the wheel spindle, a universal joint of the self-centering constant velocity type mounted in said housing and including a pair of yoke members having torque transmitting members therebetween for drivably connecting the drive shaft and the stub shaft, a member secured between said yoke members for limiting movement of said yoke members toward each other, an annular shoulder formed in the inner surface of said axle housing end concentric with said shafts, a thrust ring mounted on said shoulder and so positioned that at times dependent on axial movement of said shafts it is in bearing engagement with said adjacent yoke member for transmitting forces in the universal joint into the axle housing and for positively limiting the amount of endwise movement tending to separate said universal joint yet providing for the necessary movement axially of one yoke member relative to the other.

6. In a steering and driving wheel construction for automotive vehicles, an axle housing and a wheel spindle having their contiguous ends shaped to form a housing, king pins connecting said ends in swinging relation, a drive shaft in the axle housing and a stub shaft in the wheel spindle, a universal joint of the self-centering constant velocity type mounted in said housing and including a pair of yoke members having torque transmitting members therebetween for drivably connecting the drive shaft and the stub shaft, a member secured between said yoke members for limiting movement of said yoke members toward each other, a bearing in said wheel spindle having a portion in fixed engagement with said adjacent yoke member and adapted to receive radial thrust of said stub shaft, an annular shoulder formed in the inner surface of said axle housing end concentric with said shafts, a thrust ring mounted on said shoulder and so positioned that at times dependent on axial movement of said shafts it is in bearing engagement with said adjacent yoke member for transmitting forces in the universal joint into the axle housing and for positively limiting the amount of endwise movement tending to separate said universal joint yet providing for the necessary movement axially of one yoke member relative to the other.

7. In a steering and driving wheel construction for automotive vehicles, an axle housing and a wheel spindle having their contiguous ends shaped to form a housing, king pins connecting said ends in swinging relation, a drive shaft in the axle housing and a stub shaft in the wheel spindle, a universal joint of the self-centering constant velocity type mounted in said housing and including a pair of yoke members having torque transmitting members therebetween for drivably connecting the drive shaft and the stub shaft, a member secured between said yoke members for limiting movement of said yoke members toward each other, a wheel flange axially fixed on said stub shaft, a bearing interposed between the wheel flange and wheel spindle and having a portion in fixed engagement with said adjacent yoke member, an annular shoulder formed in the inner surface of said axle housing end concentric with said shafts, a thrust ring mounted on said shoulder and so positioned that at times dependent on axial movement of said shafts it is in bearing engagement with said adjacent yoke member for transmitting forces in the universal joint into the axle housing and for positively limiting the amount of endwise movement tending to separate said universal joint yet providing for the necessary movement axially of one yoke member relative to the other.

EDWARD B. STURGES.